United States Patent
Tomita et al.

(10) Patent No.: US 10,626,771 B2
(45) Date of Patent: Apr. 21, 2020

(54) MIXING STRUCTURE

(71) Applicant: HINO MOTORS, LTD., Hino-shi (JP)

(72) Inventors: Noriyuki Tomita, Hino (JP); Takaomi Kamiya, Miyoshi (JP); Kumiko Noda, Miyoshi (JP)

(73) Assignee: HINO MOTORS, LTD., Hino-shi (JP)

( * ) Notice: Subject to any disclaimer, the term of this patent is extended or adjusted under 35 U.S.C. 154(b) by 0 days.

(21) Appl. No.: 16/305,968

(22) PCT Filed: May 18, 2017

(86) PCT No.: PCT/JP2017/018737
§ 371 (c)(1),
(2) Date: Nov. 30, 2018

(87) PCT Pub. No.: WO2017/208846
PCT Pub. Date: Dec. 7, 2017

(65) Prior Publication Data
US 2019/0292966 A1   Sep. 26, 2019

(30) Foreign Application Priority Data

Jun. 3, 2016  (JP) ................................ 2016-111872

(51) Int. Cl.
*F01N 3/28*      (2006.01)
*B01D 53/94*     (2006.01)
*F01N 13/00*     (2010.01)
*B01D 53/90*     (2006.01)
*F01N 3/20*      (2006.01)
(Continued)

(52) U.S. Cl.
CPC ............. *F01N 3/28* (2013.01); *B01D 53/86* (2013.01); *B01D 53/90* (2013.01); *B01D 53/94* (2013.01); *B01D 53/9495* (2013.01); *F01N 3/08* (2013.01); *F01N 3/208* (2013.01); *F01N 3/24* (2013.01);
(Continued)

(58) Field of Classification Search
None
See application file for complete search history.

(56) References Cited

U.S. PATENT DOCUMENTS

2013/0164183 A1   6/2013   Iijima et al.
2015/0075122 A1   3/2015   Niaz

FOREIGN PATENT DOCUMENTS

JP   2012-21507 A    2/2012
JP   2013-133773 A   7/2013
(Continued)

OTHER PUBLICATIONS

Endo et al. JP2015-048715A—translated document (Year: 2015).*
International Search Report dated Jul. 4, 2017 in PCT/JP2017/018737, 2 pages.

*Primary Examiner* — Walter D. Griffin
*Assistant Examiner* — Jelitza M Perez
(74) *Attorney, Agent, or Firm* — Oblon, McClelland, Maier & Neustadt, L.L.P.

(57) ABSTRACT

Disclosed is a mixing structure for spraying and mixing urea water (additive agent) into and with exhaust gas 1 flowing through a communication passage 7 (exhaust flow passage). The mixing structure is provided with a curved portion 11 in the communication passage 7 downstream of a sprayed position of the urea water as well as a depression 12 on an exit side of the curved portion 11 and formed on only one of sides of the curved portion 11 bisected by a plane into plane symmetry.

8 Claims, 3 Drawing Sheets

(51) Int. Cl.
  *F01N 3/08* (2006.01)
  *B01D 53/86* (2006.01)
  *F01N 3/24* (2006.01)

(52) U.S. Cl.
  CPC ........ *F01N 13/009* (2014.06); *F01N 2610/02* (2013.01); *Y02T 10/24* (2013.01)

(56) References Cited

FOREIGN PATENT DOCUMENTS

| | | | |
|---|---|---|---|
| JP | 2014-152705 A | | 8/2014 |
| JP | 2015-48715 A | | 3/2015 |
| JP | 2015048715 A | * | 3/2015 |
| JP | 2015-105590 A | | 6/2015 |

* cited by examiner

MIXING STRUCTURE

TECHNICAL FIELD

The present invention relates to a mixing structure.

BACKGROUND ART

It has been recently proposed that a particulate filter for capturing particulates in exhaust gas is incorporated in an exhaust pipe and a selective reduction catalyst capable of selectively reacting $NO_x$ with ammonia even in the presence of oxygen is arranged downstream of the particulate filter, urea water as reducing agent (additive agent) being sprayed at a position between the selective reduction catalyst and the particulate filter, thereby attaining lessening of both the particulates and $NO_x$.

Such addition of the urea water to the selective reduction catalyst is conducted at the position between the particulate filter and the selective reduction catalyst. Thus, in order to ensure sufficient reaction time for pyrolysis of the urea water added to the exhaust gas into ammonia and carbon dioxide gas, it is necessary to prolong a distance between the urea-water added position and the selective reduction catalyst. However, arrangement of the particulate filter and the selective reduction catalyst in a substantially spaced apart relationship will extremely impair the mountability on a vehicle.

In order to overcome this, an exhaust emission control device compact in size as shown in FIG. 1 has been proposed. In the exhaust emission control device illustrated, incorporated in an exhaust pipe 2 through which exhaust gas 1 from an engine flows is a particulate filter 3 housed in a casing 5 to capture particles in the exhaust gas 1; arranged downstream of and in parallel with the particulate filter 3 and housed in a casing 6 are selective reduction catalysts 4 having a property capable of selectively reacting $NO_x$ with ammonia even in the presence of oxygen. An exit end of the particulate filter 3 is connected to an entry end of the selective reduction catalysts 4 through an S-shaped communication passage 7 such that the exhaust gas 1 discharged from the exit end of the particulate filter 3 is reversely curved back into the entry end of the adjacent selective reduction catalysts 4.

The communication passage 7 is the S-shaped structure comprising a gas gathering chamber 7A which encircles the exit end of the particulate filter 3 to gather the exhaust gas 1 just discharged from the exit end of the particulate filter 3 through substantially perpendicular turnabout of the gas, a mixing pipe 7B which extracts the gathered exhaust gas 1 from the chamber 7A in a direction reverse to the flow of the exhaust in the particulate filter 3 and a gas dispersing chamber 7C which encircles the entry end of the selective reduction catalysts 4 so as to disperse the gas 1 guided by the mixing pipe 9B through substantially perpendicular turnabout of the gas into the entry end of the selective reduction catalysts 4. The gas gathering chamber 7A is provided with an injector 8 for addition of urea water into the exhaust gas 1 discharged from the exit end of the particulate filter 3 and flowing in the substantially perpendicular turnabout.

In the example illustrated, arranged in the casing 5 and in front of the particulate filter 3 is an oxidation catalyst 9 for oxidization treatment of the exhaust gas 1, and arranged in the casing 6 and behind the paired selective reduction catalysts 4 is an ammonia lessening catalyst 10 for oxidization treatment of surplus ammonia.

With such construction being employed, particulates in the exhaust gas 1 are captured by the particulate filter 3. The urea water is added downstream of the filter and intermediately of the mixing pipe 7B into the exhaust gas 1 by the injector 8 and is pyrolyzed into ammonia and carbon dioxide gas, so that $NO_x$ in the exhaust gas 1 is favorably reduced and depurated by the ammonia on the selective reduction catalysts 4. As a result, both the particulates and $NO_x$ in the exhaust gas 1 are lessened.

In this case, the exhaust gas 1 discharged from the exit end of the particulate filter 3 is reversely curved back by the communication passage 7 into the entry end of the adjacent selective reduction catalysts 4 so that a long distance is ensured between the urea-water added position intermediately of the communication passage 9 and the selective reduction catalysts 4 to ensure enough reaction time for production of ammonia from the urea water.

Moreover, the particulate filter 3 is arranged in parallel with the selective reduction catalysts 4 and the communication passage 7 is arranged between and along the particulate filter 3 and selective reduction catalysts 4 so that the whole structure becomes compact in size to substantially enhance its mountability on a vehicle.

As a prior art literature pertinent to this kind of exhaust emission control device compact in size, there already exists, for example, the following Patent Literature 1.

CITATION LIST

Patent Literature

Patent Literature 1: JP 2015-48715A

SUMMARY OF INVENTION

Technical Problems

However, in such conventional structure, just after the urea water is added by the injector 8, the flow of the exhaust gas 1 is abruptly curved by a curved portion 11 of the communication passage 7 (the entry side of the mixing pipe 7B in the example illustrated) so that the flow of the exhaust gas 1 is biased toward outward in a curved direction of the curved portion 11 where the urea water adheres on a wall of the flow passage and becomes not well-mixed with the exhaust gas 1, possibly resulting in insufficient bringing-out of catalytic performance to be exercised.

For enhanced admixture of the urea water into the exhaust gas 1, the above-mentioned Patent Literature 1 suggests that the exhaust gas 1 is tangentially introduced by guide fins into the entry end of the mixing pipe 7B to cause the exhaust gas 1 to flow spirally and that spiral rails are arranged on an inner periphery of the mixing pipe 7B to cause the exhaust gas 1 to flow spirally. However, any of such countermeasures requires complication in structure, inevitably resulting in increase in cost.

The invention was made in view of the above and is directed to provide a mixing structure capable of substantially enhancing admixture of an additive agent into exhaust gas with no complicated structure.

Solution to Problems

The invention is directed to a mixing structure for spraying and mixing an additive agent into and with exhaust gas flowing through an exhaust flow passage, characterized by a curved portion in the exhaust flow passage downstream of a sprayed position of said additive agent, and a depression on an exit side of said curved portion and formed on only one of sides of the curved portion bisected by a plane into plane symmetry.

Then, while the exhaust gas is biased outward in the curved direction of the curved portion, the depression generates a skew flow oriented to a side opposed to the depression; the skew flow exerts a function of tilting a direction of the main exhaust gas flow flowing outside in the curved direction of said curved portion, so that the main flow flows spirally into spiral flow; the spiral flow substantially enhances admixture of the additive agent into the exhaust gas.

It is preferable in the invention that provided are a selective reduction catalyst incorporated in the exhaust flow passage and having a property of selectively reacting $NO_x$ with the reducing agent even in the presence of oxygen and an injector for spraying the reducing agent as additive agent into the exhaust gas upstream of said selective reduction catalyst, the curved portion being provided between said injector and said selective reduction catalyst.

Then, the reducing agent sprayed by the injector is well-mixed by the spiral flow into the exhaust gas, the exhaust gas flow becomes a flow along a spiral trajectory, so that a movement distance of the reducing agent is increased to ensure a long reaction time. Thus, transformation into ammonia is facilitated if the reducing agent is urea water; transformation into HC gas is facilitated if the reducing agent is fuel.

Advantageous Effects of Invention

A mixing structure as mentioned in the above according to the invention can attain various excellent effects as mentioned below.

(I) The spiral flow of exhaust gas can be easily attained by merely incorporating the curved portion and the depression in the exhaust flow passage. Admixture of the additive agent into the exhaust gas can be substantially enhanced without using a complicated structure as having been conventionally proposed.

(II) If provided are the selective reduction catalyst incorporated in the exhaust flow passage and having a property of selectively reacting $NO_x$ with the reducing agent even in the presence of oxygen as well as the injector upstream of said selective reduction catalyst for spraying the reducing agent as additive agent into the exhaust gas, the curved portion being provided between said injector and said selective reduction catalyst, then admixture of the reducing agent to the exhaust gas can be substantially enhanced and a long reaction time of the reducing agent can be ensured to facilitate transformation of urea water into ammonia or transformation of fuel into HC gas. Thus, catalytic performance of the selective reduction catalyst can be sufficiently brought out to obtain high exhaust depuration effect.

DESCRIPTION OF EMBODIMENT

An embodiment of the invention will be described in conjunction with the drawings.

Figure 1:
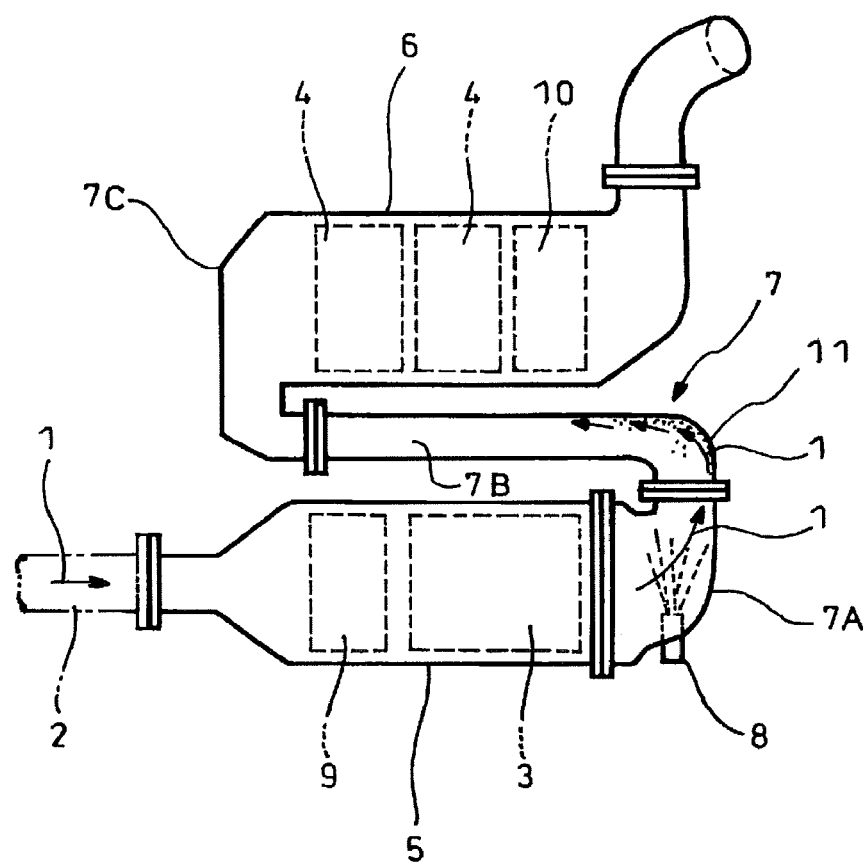
FIG. 1 is a schematic diagram showing a conventional example.
Figure 2:
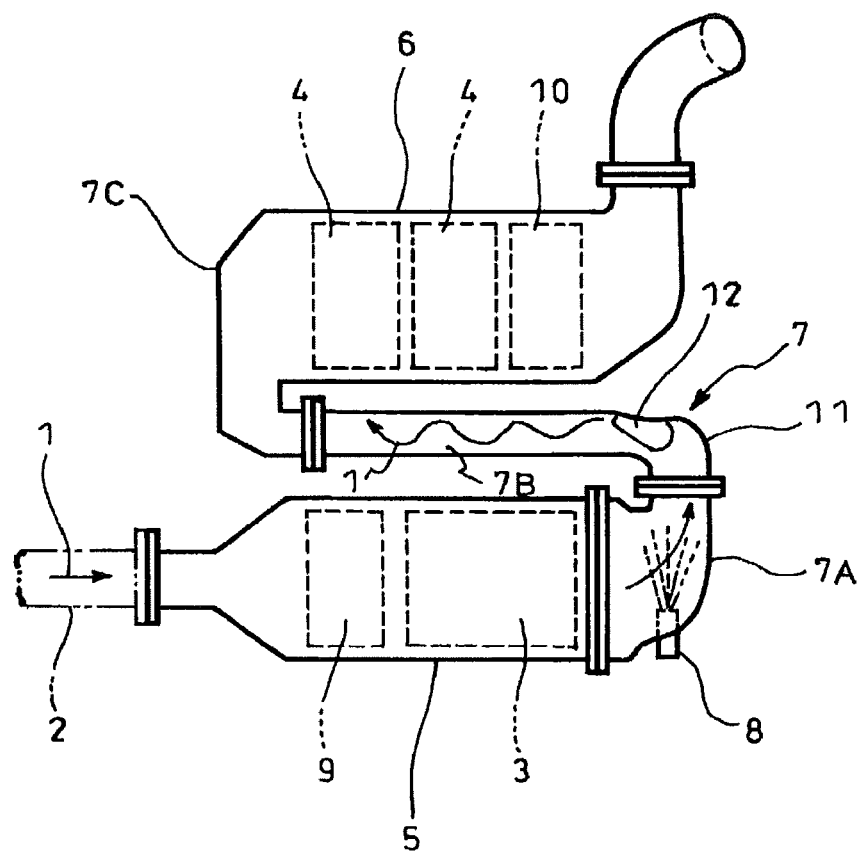
FIG. 2 is a schematic diagram showing an embodiment of the invention.
Figure 3:
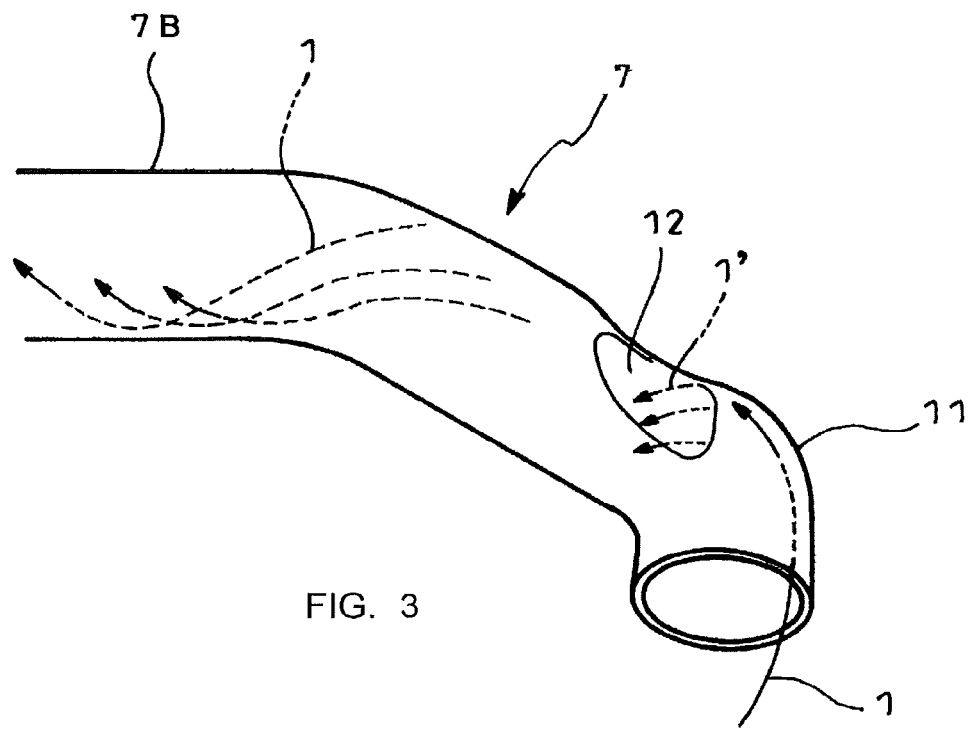
FIG. 3 is an enlarged perspective view showing a relevant part in FIG. 2.
Figure 4:
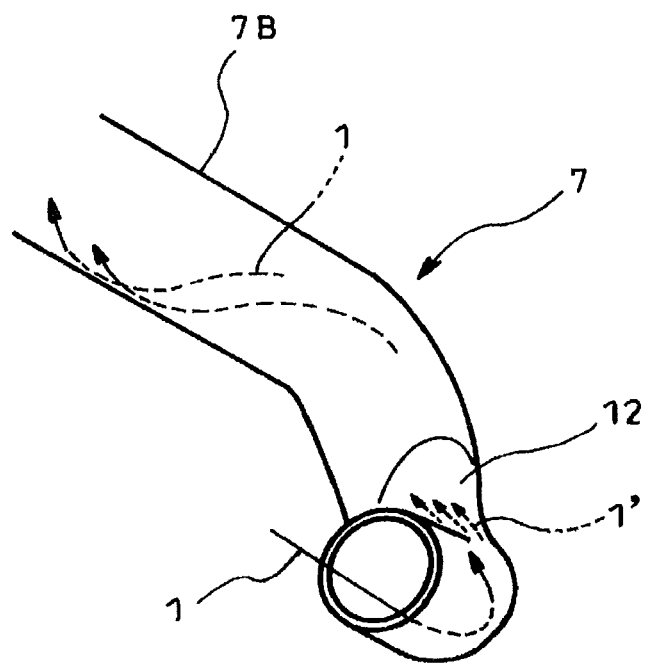
FIG. 4 is a perspective view of the relevant part in FIG. 2 viewed in an angle different from that in FIG. 3.

FIGS. 2-4 show the embodiment of the invention which is constructed substantially similar to the above-mentioned example shown in FIG. 1, is applied to an exhaust emission control device and is characterized in that the mixing structure comprises a curved portion 11 in a communication passage 7 (exhaust flow passage) downstream of a sprayed position of urea water (reducing agent (additive agent)) by an injector 8, and a depression 12 on an exit side of the curved portion 11 and formed on one of sides of the curved portion 11 bisected by a plane into plane symmetry (assumed is plane symmetry in a state that below-mentioned depression 12 is not formed yet). In the illustrated exhaust emission control device in which a particulate filter 3 is arranged in parallel with and is communicated through the S-shaped communication passage 7 with selective reduction catalysts 4, a curved portion 11 already exists just after the injector 8. The invention can be applied by utilizing the curved portion 11 as it is and newly providing only the depression 12.

Then, while the flow of the exhaust gas 1 is biased toward outward in the curved direction of the curved portion 11, the depression 12 generates a skew flow 1' (see FIGS. 3 and 4) oriented to a side opposite to the depression 12; the skew flow 1' exerts a function of tilting a direction of the main exhaust gas flow flowing outside in the curved direction of the curved portion 11, so that the main flow flows spirally into spiral flow; the spiral flow substantially enhances admixture of the urea water into the exhaust gas 1.

Especially, the embodiment is applied to the exhaust emission control device with selective reduction catalysts 4 so that, in addition to the fact that the urea water sprayed by the injector 8 is well-mixed by the spiral flow into the exhaust gas 1, the flow of the exhaust gas 1 becomes a flow along the spiral trajectory so that a movement distance of the urea water is increased to ensure a long reaction time, thereby facilitating transformation of the urea water into ammonia.

If the selective reduction catalyst 4 has a property capable of selectively reacting $NO_x$ with HC gas even in the presence of oxygen and the reducing agent sprayed by the injector 8 is fuel, facilitated is transformation of the fuel into HC gas.

Thus, according to the above embodiment, the spiral flow of the exhaust gas 1 can be extremely easily attained by merely incorporating the curved portion 11 and the depression 12 in the communication passage 7. Thus, without using a complicated structure as having been conventionally suggested, admixture of the urea water to the exhaust gas 1 can be substantially enhanced and a long reaction time can be ensured to facilitate transformation of urea water into ammonia so that catalytic performance of the reduction catalyst 4 can be sufficiently brought out to obtain high exhaust depuration effect.

It is to be understood that a mixing structure according to the invention is not limited to the above embodiments and that various changes and modifications may be made without departing from the scope of the invention. For example, the additive agent is not necessarily limited to the reducing agent to the selective reduction catalysts.

REFERENCE SIGNS LIST 1 exhaust gas
4 selective reduction catalyst 7 communication passage (exhaust flow passage)
8 injector
11 curved portion
12 depression

The invention claimed is:

1. A mixing structure for spraying and mixing an additive agent into and with exhaust gas flowing through an exhaust flow passage, comprising:
   a gas gathering chamber into which the additive agent is sprayed, the gas gathering chamber encircling an exit side of a particulate filter;
   a curved portion in the exhaust flow passage downstream of the gas gathering chamber; and
   a depression on an exit side of said curved portion and formed on only one side of the curved portion bisected by a plane into plane symmetry.

2. The mixing structure as claimed in claim 1, further comprising:
   a selective reduction catalyst incorporated in the exhaust flow passage and having a property of selectively reacting NOx with the reducing agent even in the presence of oxygen; and
   an injector that sprays a reducing agent as additive agent into the gas gathering chamber, the curved portion being provided between said injector and said selective reduction catalyst.

3. The mixing structure as claimed in claim 2, further comprising:
   a mixing pipe that extends downstream from the depression which is on an exit side of the curved portion, the mixing pipe extending substantially parallel to a flow direction of the exhaust through the selective reduction catalyst.

4. The mixing structure as claimed in claim 1, wherein the curved portion is at an exit side of the gas gathering chamber and turns the exhaust gas exiting the gas gathering chamber in a direction substantially reverse to a flow of the exhaust gas in the particulate filter.

5. The mixing structure as claimed in claim 4, wherein the gas gathering chamber is substantially perpendicular to the flow of the exhaust gas in the particulate filter.

6. The mixing structure as claimed in claim 2, wherein the injector injects the additive agent in a direction substantially perpendicular to the flow of the exhaust gas in the particulate filter.

7. The mixing structure as claimed in claim 1, wherein the depression generates a skew flow in the exhaust gas oriented to a side opposite of the depression.

8. The mixing structure as claimed in claim 3, wherein the depression generates a skew flow in the exhaust gas oriented to a side opposite of the depression so that the exhaust gas has a spiral flow in the mixing pipe.

* * * * *